United States Patent
Yates

[15] 3,676,362
[45] July 11, 1972

[54] METHOD FOR MAKING METAL OXIDE SOLS IN POLAR ORGANIC SOLVENTS

[72] Inventor: Paul C. Yates, Wilmington, Del.

[73] Assignee: E. I. du Pont de Nemours and Company, Wilmington, Del.

[22] Filed: Nov. 30, 1970

[21] Appl. No.: 93,846

[52] U.S. Cl. ..........................252/309, 260/29.6, 252/8.1, 260/40, 260/41, 260/37, 23/144
[51] Int. Cl. .......................................................B01j 13/00
[58] Field of Search ........................252/313, 309; 75/1, 103; 23/144

[56] References Cited

UNITED STATES PATENTS

| | | | |
|---|---|---|---|
| 1,879,022 | 9/1932 | Barclay | 23/144 |
| 2,585,341 | 2/1952 | Mochel | 23/144 |

*Primary Examiner*—John D. Welsh
*Attorney*—Don M. Kerr

[57] ABSTRACT

Sols of $Sb_2O_3$, $SnO_2$, $TiO_2$ and $ZrO_2$ in organic polar liquids are prepared by reacting a soluble salt of the metal with water and ammonia in a solution of the liquid. The reaction produces the metal oxide in colloidal dispersion and an insoluble ammonium salt, which precipitates and is filtered off. Sols in liquids which are solvents for organic polymers are used to incorporate metal oxides into the polymers to provide flame resistance and other desirable properties.

7 Claims, No Drawings

METHOD FOR MAKING METAL OXIDE SOLS IN POLAR ORGANIC SOLVENTS

BACKGROUND OF THE INVENTION

Attempts have been made to incorporate metallic oxides such as the oxides of antimony, tin, titanium, and zirconium, into organic polymers both natural and synthetic, to improve a number of their properties. For example, these oxides have been used to improve the resistance to burning, particularly when employed in conjunction with organic halogen compounds. In other instances, screening out ultraviolet light by the oxide has been sought. Oxides of this class have been employed as delustering and weighting agents for artificial silk, nylon and other materials. They have also been used to insolubilize films such as cellulose, starch, and polyvinyl alcohol against the action of boiling water, as well as for other purposes.

A variety of techniques have been employed to introduce the metal oxides into organic polymers. For example, ground oxide particles prepared by milling calcined oxides have been suspended in spinning solutions, molding solutions, or polymer melts, to incorporate the oxide in the resulting film, fiber, or molded body. Oxides have been applied as surface coatings along with a resinous binder as dispersions or suspensions of the oxide in the resinous binder vehicle or solvent. Other procedures have involved dissolving a soluble salt or other metal compound in the spinning solution, molding solution, or polymer melt, and hydrolyzing to the oxide by a reaction in situ within the film or fiber, usually with an aqueous solution or steam. A variant of this procedure involves impregnating or dyeing a soluble metal compound into a swollen polymer, followed by hydrolysis of this to the oxide. Finally, efforts have been made to incorporate metal oxides in the form of finely divided aggregates or powders or dried gels by mixing them in a spinning solution, a molding solution or a polymer melt.

Each of these procedures is subject to a number of deficiencies both in terms of processing problems and in terms of the characteristics of the products obtained.

The process of mixing relativly coarse oxides prepared by grinding into a spinning solution, molding solution or polymer melt usually results in severe delustering of the polymer due to scattering of light from the large oxide particles. Large particle size also results in low chemical reactivity except for the surface atoms which constitute only a small portion of the total. The low reactivity, in turn, results in low efficiency as flameproofing agents. Fibers or films filled with coarse particles suffer impaired mechanical properties. In the case of fibers, the diameter of the particles may approach the diameter of the fibers themselves and the bonding between the organic polymer and the inorganic material is often susceptible to rupture via water adsorption at the interface. Finally, this technique results in major processing difficulties such as pluggage of spinnerets and filter packs and breakage of filaments due to mechanical weakness.

The technique of coating the surface of a film or fiber with a binder plus the metal oxide in the suspended but large particle form also results in delustering and produces fabrics which have a stiff, harsh hand, poor flexibility and low tear strength. Because of the large size of the oxide particles they are not efficient as flameproofing agents and high loadings, in the order of 20 to 50 percent, have had to be employed. Since the oxides are bonded onto the surface they are attacked by solvents and have poor permanency.

The technique of dissolving a soluble salt or other compound in the spinning solution, molding solution, or melt and hydrolyzing to the oxide by a subsequent reaction with water or with steam is difficult to control and generally leads to aggregation of particles. Aggregation results in delustered products and reduced efficiency of flameproofing action. The same deficiencies are exhibited by the technique involving impregnating or dyeing the oxide precursor into a swollen polymer then hydrolyzing to the oxide.

The art attempted to avoid some of the deficiencies of the above procedures by milling or suspending finely divided aggregates of metal oxide into a spinning solution, molding solution, or polymer melt. In this way a more active flameproofing material could be obtained by using a high surface area oxide having a higher percentage of the atoms on the surface where they could react quickly to exert their flameproofing effect. The art has used aggregates prepared as gels, as precipitated powders, and as aggregates prepared by oxidizing the corresponding metallic halides. Although improvements in efficiency were obtained by this procedure, there were still a number of problems. The procedure always involves a greater or lesser degree of aggregation which in turn causes delustering, although not as serious as the delustering caused by single particles as large as the aggregates. Although there are more atoms on the surface in an aggregate than in a unitary particle of similar size, the flameproofing efficiency of an aggregate is considerably less than that of the discrete ultimate particles of the same size as those making up the aggregate, homogeneously distributed throughout the polymer.

It has been found that these deficiencies of the prior art can be overcome by a technique which involves first preparing a sol composed of substantially discrete (i.e. non-aggregated) colloidal particles of metal oxide having an average particle size in the range of about 2 to about 50 millimicrons, dispersed in a polar, organic liquid. The organic liquid is one which will dissolve the polymer into which it is desired to incorporate the metal oxide. The sol is then mixed with a solution of the polymer in the polar, organic liquid and the polymer solution is processed in a conventional manner for example by solution spinning of fibers or casting of films.

SUMMARY OF THE INVENTION

This invention is a method for making a sol of substantially discrete colloidal particles of an oxide of a metal selected from the group consisting of antimony, tin titanium, and zirconium, in a polar, organic liquid, which comprises reacting a salt of the metal with water and ammonia in a solution of the liquid to produce the metal oxide in colloidal dispersion and an insoluble ammonium salt, then removing the ammonium salt. The amount of water used is at least the stoichiometric amount required for converting the metal salt to the metal oxide but not substantially in excess of the stoichiometric amount required for converting the metal salt to the metal hydroxide. The amount of ammonia used is that required to react with most, but not all, of the anion of the metal salt. Some of the anion is left in the sol to stabilize it.

For example, $SbCl_3$ is dissolved in dimethylformamide and is reacted with water and ammonia gas. This reaction produces $Sb_2O_3$ is colloidal dispersion and ammonium chloride. The ammonium chloride which is insoluble in the dimethylformamide precipitates and is filtered off. The remaining sol is stabilized by residual chloride ion.

The residual chloride (or other anion of metal salt) can subsequently be exchanged for another stabilizing anion, if desired, by addition of an acid of the new anion plus sufficient ammonia to remove the original anion as its insoluble ammonium salt. Typical exchange anions include formate, acetate, hydroxyacetate, salicylate and phthalate. Alternatively, the surfaces of the metal oxide particles can be esterified by reaction with a primary or secondary alcohol containing one through four carbon atoms and the residual chloride removed by reaction with ammonia, to provide a sol stabilized by alkoxy species.

The preferred organic liquids for use in the process are those which are solvents for commercially important polymers. Typical solvents include dimethylformamide, formamide, methylformamide, formic acid, dimethylacetamide, methylacetamide, dimethylsulfoxide, dimethylsulfone, tetramethylurea and diethylene glycol ethers.

The invention produces stable sols composed of substantially discrete particles of the metal oxide dispersed in the polar, organic liquid. The metal oxide particles have an average particle size in the range of about 2 to about 50 millimicrons. The sols are stabilized by presence of a stabilizing species such as halide, alkoxy of one to four carbon atoms, or carboxylate of one to eight carbon atoms. The sols are particularly suited for incorporating metal oxides into fibers such as polyacrylonitrile which are spun from solutions in organic liquids such as dimethylformamide to provide fibers with increased flame resistance. Since the metal oxide particles are substantially discrete, they do not lead to increased viscosity of the spinning solution, delustering of the fiber or plugging of the spinnerets and filter packs.

DESCRIPTION OF THE INVENTION

The process of this invention involves reacting a salt of a metal selected from the group consisting of antimony, tin, titanium and zirconium with water and ammonia in solution in a polar, organic liquid. The amount of water should be at least equal to the stoichiometric amount required to convert the metal salt to the corresponding metal oxide but not substantially in excess of the amount required to convert to the metal hydroxide. It is preferred that the final sol contain less than 1 percent by weight of free water.

The metal salt is dissolved in the polar, organic liquid, water is added, and ammonia is introduced as a gas or as a solution in the solvent. The reaction produces an ammonium salt with the anion of the metal salt and it also produces the hydrous metal oxide in colloidal dispersion. The ammonium salt is insoluble in the organic solvent; it precipitates and is filtered off.

Addition of ammonia is continued until the desired amount of anion is removed by formation of the ammonium salt and precipitation. Usually it is desired to remove between about 50 and 90 percent of the anion, preferably between about 65 and 80 percent. A portion of the anion must be left in the sol to stabilize the charged colloidal oxide particles against gelling. The amount of stabilizing anion required varies with particle size. In general the smaller the particle size the greater proportion of anion required. It is believed that the function of this anion is to impart an electrostatic charge to the surface atoms of the metal oxide particles, which otherwise would have a tendency to join with one another, causing particle growth, agglomeration, and flocculation. However, the exact nature of the stabilization mechanism is not known with certainty.

If the essentially complete removal of the anion of the metal salt precursor is desired, an acid may be added which will provide a suitable stabilizing anion other than the initial one. Care must be exercised, of course, to insure that the ammonium salt of the added anion is more soluble than the ammonium salt of the original anion in order to effect the exchange of the anions in this fashion.

An alternate process is to react the sol in the organic liquid with an anion exchange resin containing the anion with which it is desired to replace the original anion. The original anion is then taken up on the anion exchange resin which can be removed from solution by filtration or other suitable physical means.

If it is desired to obtain an anion-free composition this may be done by reacting the unsatisfied valences of the surface atoms of the metal oxide particles with an organic alcohol to prepare a surface ester. The acid formed between the proton of the alcohol and the anion of the metal salt may be removed by precipitation with additional ammonia as the insoluble ammonium salt or by anion exchange with an anion exchange resin. Lower chain aliphatic alcohols having less than five carbon atoms, such as methanol, ethanol, propanol, isopropanol, and butanol, are preferred alcohols for esterification. Primary and secondary alcohols are preferred over tertiary alcohols.

The metal salt precursor must be soluble in the polar, organic liquid and it must have an anion which will form an ammonium salt that is substantially insoluble in the same liquid. The liquid must, of course, be non-reactive other than forming solvates with the metal salt precursors of the oxide and must be a good solvent for synthetic organic polymers used for films and fibers. It must also be sufficiently polar to allow the counter anions to stabilize the charged sol particles.

Metal bromides and metal chlorides, especially the chlorides, are the preferred starting metal salts. Preferred liquids include dimethylformamide, formamide, methylformamide, acetamide, methylacetamide, dimethylacetamide, dimethylsulfoxide, dimethylsulfate, dimethylurea, N-methyl-2-pyrrolidone, anhydrous formic acid, and the diethylene glycol ethers. Particularly preferred are the liquids most commonly used in the solution spinning of polyacrylonitrile fibers, namely dimethylformamide, dimethylacetamide, and dimethylsulfoxide.

Certain of these solvents, such as dimethylsulfoxide, are sufficiently good solvents for the ammonium salt of the metal anions to retain too much of the salt dissolved in the final product. In such cases the reaction may be performed in a solvent such as dimethylformamide, which shows a very low solubility for such ammonium salts, and the product transferred by distillation into one of the other solvents, if its boiling point is higher than that of dimethylformamide. For those solvents which have lower boiling points than dimethylformamide the colloidal dispersion can be evaporated at a low temperature (25°C. to 60°C.) under vacuum to a solid condition and this can be dissolved or repeptized in the lower boiling solvent into which it is desired to transfer it.

The precipitation reaction with ammonia is carried out in the liquid solvent preferably at a temperature in the range of 0°C. and 100°C. Since the reaction is exothermic it may be necessary to apply cooling or conduct the reaction under reflux conditions. As noted above, some of the ammonium salt may be soluble to varying degrees in the solvent and cooling may be necessary to complete the removal of the anion as the ammonium salt. The use of higher temperatures may sometimes be necessary to grow the particles and avoid gel formation which prevents effective dispersion of ammonia. However, excessive heating must be avoided because the particles can also grow so large that they precipitate.

The solids concentration is preferably maintained between about 1 and 10 percent by weight during the reaction. The sols may subsequently be concentrated up to about 30 percent or greater by evaporation of the solvent, preferably by vacuum distillation.

In the case of stannic chloride the reaction may be expressed by the following equation where 75 percent of the chloride ion initially present is precipitated as ammonium chloride:

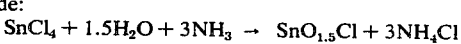

$$SnCl_4 + 1.5H_2O + 3NH_3 \rightarrow SnO_{1.5}Cl + 3NH_4Cl$$

In this case the tin oxide particles carry a positive charge and are stabilized by the negatively charged chloride counter ions.

For purposes of mixing with negatively charged polymer solutions such as polyamides in formic acid or polyacrylonitrile in dimethylformamide, it is desired that the colloidal metal oxide not have a charge opposite that of the negatively charged polymer. This causes flocculation of the polymer with the oxide, resulting in delustering and lower effectiveness of the oxide as a flameproofing material. This can be avoided by a reaction of esterification with a suitable alcohol such as ethanol, as shown by the following reaction equation:

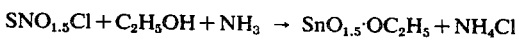

$$SnO_{1.5}Cl + C_2H_5OH + NH_3 \rightarrow SnO_{1.5} \cdot OC_2H_5 + NH_4Cl$$

The resulting surface-esterified colloidal stannic oxide sol now no longer has a positive charge and is compatible with negatively charged polymers such as those discussed above.

Zirconium and titanium oxides, being more strongly acidic, tend to ionize at their surface metal-OH groups to furnish a proton and give a negatively charged colloidal particle. Thus, titania and zirconia sols are already negatively charged and it is not necessary to esterify their surfaces to reverse the charge and confer compatibility with negatively charged polymers.

In use the sols made by the process of the invention are mixed with solutions of polymers which are soluble in the polar, organic liquids. Examples of polymers which can be made flame resistant by incorporation of the sols include acrylonitrile polymers such as polyacrylonitrile, copolymers of acrylonitrile with vinyl halides and copolymers of acrylonitrile with vinylidene halides, polyamides such as 66-nylon, polyesters such as polyethylene terethalate, polyurethanes, polyacrylates, vinyl halide polymers such as polyvinyl chloride and vinyl chloride/vinyl acetate copolymers and acrylonitrile-butadiene-styrene copolymers. After the sol is mixed with the polymer solution, the polymer can be processed in a conventional manner to make shaped articles. Thus, the solution can be used directly for solution spinning of fibers, casting of films or preparations of preparation Alternatively the solvent can be removed and the polymer containing the colloidal oxide can be melt extruded to form rods, pellets, fibers or films, or molded to form other articles.

The sols have high efficiency as flame retardant additives, particularly when the organic polymer into which they are incorporated contains a source of organic halogen. For example, suitable organic halogens can be furnished either from a halide-containing copolymer such as vinyl chloride, vinylidene chloride or vinyl bromide copolymerized with acrylonitrile, or as an additive such as halide-containing hydrocarbons of appreciable molecular weight which are essentially nonvolatile. Examples of such additives are polyvinyl chloride, chlorinated or brominated terpenes, chlorinated or brominated waxes and the like.

The amount of metal oxide which should be incorporated into polymers to provide effective flame resistance varies somewhat with the nature of the polymer and the degree of flame resistance required, but will generally range between 0.5 percent and 20 percent by weight of the polymer. Loadings below 0.5 percent are often insufficient to achieve substantial improvements in flame resistance while amounts in excess of 20 percent are usually not required even with polymers most susceptible to burning. Generally, polymers which have a halogen attached to the polymer chain or which contain an organic, halogen-containing additive, such as polyvinyl chloride, tetrabromophthalic anhydride, chlorinated or brominated waxes, and terpenes, respond most favorably to the metal oxides, presumably because of the formation of volatile metal halides and oxyhalides which interfere with flame propagation by trapping free radicals. For this reason, smaller amounts of the metal oxides are required when used in conjunction with organic halogens, and highly flame resistance polymers can be prepared having only a few percent of metal oxide particles.

The most preferred range for metal oxide content is about 1–10 percent by weight based on the weight of the polymer in compositions containing organic halogen and about 5–19 percent (same basis) in compositions containing no organic halogen.

The process of this invention and the manner of using products prepared thereby are illustrated by the following examples. In the examples flame resistance is determined by the standard limiting oxygen index (LOI) analysis. In this procedure a sample of fabric or film is ignited from the top in a chamber containing a controlled proportion of oxygen and the percent oxygen required to just continue flame propagation is measured. The higher the percentage of oxygen observed the more flame resistant is the polymer.

EXAMPLE 1

One mole of anhydrous antimony trichloride is dissolved in 1,000 grams of dimethylformamide and 18 grams of water are added. A solution of 2.5 moles of ammonium hydroxide in DMF (dimethylformamide) is prepared by bubbling ammonia through a chilled DMF solution. This solution is added to the antimony trichloride-water-DMF solution until the pH reaches 6.0. The temperature is maintained at about 15° C. during the addition. The product is filtered to remove precipitated ammonium chloride, and the clear dispersion in dimethylformamide is analyzed for percent chloride, percent antimony, and percent $H_2O$. The product is found to contain 4.80 percent antimony, 1.03 percent chloride, and 1.06 percent water. Electron micrographs are obtained, and the product is shown to consist of a dispersion of discrete, spherical colloidal particles of antimony trioxide, approximately 3 millimicrons in diameter. The ratio of moles of chloride anion as a stabilizing agent to the moles of surface antimony groups are therefore 0.79. This is based on an estimated population density of approximately 5 antimony surface groups per square millimicron of surface.

The dimethylformamide is evaporated from a portion of this dispersion under vacuum, to leave a dried, solid product. This is analyzed by X-ray diffraction and shown to consist of crystalline cubic antimony trioxide.

A portion of the dispersion is mixed with 4 moles of ethyl alcohol per mole of antimony present and heated at 60°C. for 1 hour. Ammonia gas is then bubbled in, maintaining the temperature at 60°C. to remove the major portion of the remaining chloride as insoluble ammonium chloride. The product is filtered and distilled under vacuum at 30°C. to remove the excess alcohol. The product is a stable dispersion of surface-esterified colloidal antimony oxide particles in DMF. Polyacrylonitrile is dissolved in a portion of the dispersion and a 20 percent vinylidene chloride/80 percent acrylonitrile copolymer is dissolved in another portion, by stirring the polymer into the dispersion at 110°C. In each case, a clear solution containing 30 percent by weight polymer is obtained. Films and fibers prepared from these solutions are lustrous and clear, indicating no flocculation between the negatively charged polyacrylonitrile molecules and the neutrally charged antimony oxide surface-esterified colloid. The films and fabrics knitted from the fibers exhibit enhanced flame resistance in the LOI test as compared to control samples containing no antimony oxide.

This product is found to retain approximately one mole of ethyl alcohol per mole of surface antimony groups in the form of a surface ester.

EXAMPLE 2

346 grams of anhydrous stannic chloride are mixed into 800 grams of dimethylformamide and 47.8 grams of water, and the mixture heated to 100°C. and held for one-half hour. This is cooled to 15°C. in an ice bath, and gaseous ammonia is bubbled into the solution until the initial pH of 2.4 is increased to 4.01. The time of addition is 14 minutes. At this point, the solution is filtered and ammonia gas is passed in over an additional 15-minute period, until the pH is 6.0. The precipitated ammonium chloride is again filtered and washed and the filtrate heated to 100°C. and held at this temperature for one-half hour. At this point the pH has dropped to 5.6, and ammonia gas is passed in until the pH increases to 6.5. The ammonium chloride is again filtered, and the solution analyzed for percent tim, percent chloride, and percent water. The percent tin is 10.75, chloride 5.0 percent, water, 0.95 percent. The product is examined in an electron microscope and found to consist of a dispersion of discrete, spherical colloidal particles of amorphous stannic oxide having an average particle diameter of 5 millimicrons. The molar ratio of chloride stabilizing anions to surface tin groups, based on an estimated population of 5 tin atoms per square millimicron of tin surface, is calculated to be 7.15.

This is a water-clear, stable sol of colloidal particles. When mixed with polyacrylonitrile polymer, it makes a solution with a slight indication of coagulation of the positively charged stannic oxide sol with the negatively charged acrylonitrile polymer. The coagulation is only slight, however, as shown by the fact that this material can be cast to form only slightly delustered films, and spun with no difficulty, to prepare fibers. The stannic oxide alone substantially increases the flame resistance of polyacrylonitrile as shown by the value of the limiting oxygen index. At a 10 percent stannic oxide loading in polyacrylonitrile, it is found that the LOI increases from a value of 0.18 for the unmodified fiber, to 0.24 for the sample containing the stannic oxide. When a polyacrylonitrile containing 15 percent vinyl chloride as a copolymer is substituted for the polyacrylonitrile fiber, using identical processing procedures, and still at a loading of 10 percent stannic oxide in the fiber, it is found that the LOI increases from 0.21 for the unmodified copolymer fiber, to 0.30 for the stannic oxide-containing fiber. This fabric is only slightly delustrered over unmodified controls containing no stannic oxide.

EXAMPLE 3

346 grams of anhydrous stannic chloride are mixed with 48 grams of water and 800 grams of dimethylformamide which has previously been chilled in ice to 5°C. The stannic chloride is added to the mixture first, followed by the water, and the temperature is not allowed to exceed 60°C. The mixture is then heated to 80°C. for one-half hour, and ammonia gas is passed in until the starting pH of 2.7 has increased to 4.0. The time of addition of the ammonia is 15 minutes, and the temperature is maintained below 30°C. during the addition. 94 grams of ammonium chloride precipitate are recovered by filtration and ammonia is then passed through the filtrate until the pH reaches 5.5. This addition of ammonia occurs over a time of 30 minutes, while maintaining the temperature below 30°C. This is filtered, and 87 grams of ammonium chloride are recovered. Following each filtration, the ammonium chloride is washed with DMF and the washings added to the filtrate, so that the final product obtained weighs 1,340 grams. 460 grams of ethyl alcohol are added to this, and the mixture heated to 73°C. and ammonia is passed into the solution over a period of 50 minutes while the pH goes from 4.6 to 6.0, and the temperature is maintained between 72° and 75° C. This is chilled to 25°C. and the ammonium chloride resulting is centrifuged out of solution by spinning for 15 minutes at 2,000 rpm. The ammonium chloride cake from the centrifugation is washed with approximately a liter of DMF, and this wash filtered and added to the product. Approximately 71 grams of ammonium chloride are recovered at this stage. The product is then distilled to eliminate water and excess ethyl alcohol, and the product analyzed. It is found to contain 6.6 percent tin, 1.6 percent chloride, and 0.2 percent water. This material is completely compatible with polyacrylonitrile and with a vinyl bromide/acrylonitrile copolymer to give lustrous, clear films and fibers. Electron micrographs, X-ray diffraction and chemical analyses indicate that the product is amorphous stannic oxide, of about 3 millimicron particle diameter, which contains 1 mole of esterified ethoxy groups per mole of surface stannic oxide. It also still contains 2.3 chloride anions per mole of surface tin atoms.

EXAMPLE 4

280 grams of anhydrous titanium tetrachloride are weighed into 1,000 grams of DMF and added to 72 grams of water dissolved in 700 grams of DMF. The mixture is cooled to 30°C. and the initial pH of 0.2 is increased to 3.0 over a time of 1 hour and 11 minutes, by feeding in ammonia gas while maintaining the temperature within the range of from 30° to 40°C. The ammonium chloride is filtered off and the product, a clear dispersion in dimethylformamide, analyzed. It is found to contain 4.85 percent titanium, 3.97 percent chloride, and 2.11 percent water. Electron micrographs show the average particle diameter to be about 5 millimicrons and an X-ray diffraction pattern of the dry material obtained by evaporating under vacuum at 30°C. indicates it to be amorphous. The ratio of stabilizing chloride anion to surface titanium atoms is found to be 5.2, based on an estimated population density of 5 titanium atoms per square millimicron of titania surface.

This product is mixed with polyacrylonitrile, and with acrylonitrile copolymers with vinyl chloride, vinylidene chloride, and vinyl bromide, with the polymer being dissolved in a DMF solution containing the titania colloid, at a loading of 10 percent of $TiO_2$ based on the weight of polyacrylonitrile or modified polyacrylonitrile. This material is spun into fibers and cast as films, and gives water-clear, completely lustrous films and fibers. In spite of the fact that titania is normally thought to be a delustering agent, these fibers containing 10 percent titania are lustrous.

EXAMPLE 5

233 grams of anhydrous zirconium tetrachloride are weighed into 2,000 grams of dimethylformamide, and 32 grams of water are added. Gaseous anhydrous ammonia is bubbled in until the final pH of the solution is 2.2. 130 grams of ammonium chloride are recovered. After filtering and washing the ammonium chloride, the solution is analyzed and found to contain 6.17 percent of zirconium oxide, 3.12 percent chloride, and 0.3 percent water. Electron micrographs show spherical, nonaggregated, colloidal zirconia particles having an average diameter of about 10 millimicrons. Evaporation of a portion of the solution shows the dried product to be amorphous zirconium oxide. The ratio of chloride stabilizing anion to surface zirconium atoms calculated as in previous examples is 9.2. This material is useful in pharmaceutical compositions such as antipruritic creams for the control of dermatitis caused by poison ivy, and other minor skin irritations.

EXAMPLE 6

The clear DMF colloidal solution of antimony oxide prepared as described in Example 1 (prior to esterification) is evaporated to dryness in a vacuum desiccator at room temperature for a one week period, with essentially quantitive recovery of the antimony oxide. Ten grams of this are mixed with 100 grams of dimethylsulfoxide and stirred at 25°C. The solid antimony oxide disperses immediately to give a clear, colorless solution of antimony oxide in dimethylsulfoxide. Electron micrographs show that the particle size and degree of dispersion is essentially unchanged compared with that of the original sol in dimethylformamide. This is repeated in dimethylacetamide, and again 10 grams of the dry antimony oxide concentrate dissolves to give a clear, colorless solution which has essentially unchanged particle size and degree of dispersion in the dimethylacetamide solvent relative to its original state of dispersion and particle size as prepared in dimethylformamide.

EXAMPLE 7

The titanium dioxide sol of Example 4 is evaporated to dryness by evacuation in a vacuum desiccator at room temperature for one week to give a dry, colorless concentrate. 10 percent solutions of this are prepared in dimethylsulfoxide and dimethylacetamide by stirring at 25°C. Electron micrographs of the product show that it has not changed in particle size or degree of dispersion in the new solvents relative to the particle size and degree of dispersion in the original dimethylformamide synthesis solvent.

EXAMPLE 8

The stannic oxide sol of Example 2 is evaporated to dryness in a vacuum desiccator attached to a high speed vacuum pump for a week at room temperature, and a dry solid material is obtained. This material dissolves at 25°C. in dimethylsulfoxide, while stirring, to give a 10 percent solution of stannic oxide in dimethylsulfoxide. The particle size distribution and particle size, as well as the degree of dispersion, is unchanged relative to that of the original sol in dimethylformamide.

EXAMPLE 9

To 120 grams of dimethylacetamide are added 22.6 grams or one-tenth mole of anhydrous antimony trichloride, and 3.6 grams of water. The pH at this point is 2.1. Ammonia gas is bubbled into this solution until the pH is increased to 3.7 and the precipitated ammonium chloride is filtered off to give a clear filtrate. Chemical analysis shows the remaining product to contain 7.30 percent antimony oxide, and 4.6 percent chloride; it also contains 0.5 percent water. Upon examination by X-ray diffraction and electron micrograph, the product is shown to consist of approximately 3 millimicron particle diameter discrete, colloidal, spherical particles of cubic antimony oxide. The product is thus quite similar to that of Example 1, with the exception of its synthesis in a dimethylacetamide solvent rather than a dimethylformamide solvent.

I claim:

1. A method for making a sol of substantially discrete particles of an oxide of a metal selected from the group consisting of antimony, tin, titanium, and zirconium, in a liquid selected from the group consisting of formamide, methylformamide, dimethylformamide, acetamide, methylacetamide, dimethylacetamide, dimethyl sulfoxide, dimethylurea, N-methyl-2-pyrrolidone, and diethylene glycol ethers; said method comprising contacting a bromide or chloride salt of the metal with at least the stoichiometric amount of water required for converting the metal salt to the metal oxide, but not substantially in excess of the stoichiometric amount required for converting the metal chloride to the metal hydroxide; and with ammonia in an amount sufficient to react with most but not all of the anion of the metal salt in a solution of the liquid to produce the metal oxide in colloidal dispersion and an insoluble ammonium salt, then removing the ammonium salt.

2. Method of claim 1, wherein the amount of ammonia is between about 50 and 90 percent of that required to react with the salt whereby the sol contains residual anion of the salt.

3. Method of claim 2 wherein the salt is a chloride.

4. Method of claim 3, wherein the solvent is selected from dimethylformamide and dimethylacetamide.

5. Method of claim 4, which comprises the further step of replacing the chloride anion with another stabilizing anion by adding an acid of the second anion and sufficient ammonia to react with the remainder of the chloride.

6. Method of claim 5, wherein the acid is a member of the group consisting of formic, acetic, hydroxyacetic, salicylic, and phthalic acids.

7. Method of claim 4, wherein an alcohol selected from the aliphatic primary and secondary alcohols having less than five carbon atoms is contacted in at least equimolar quantities to the metal content of the sol and reacted with it to esterify the surface atoms of the metal oxide with said alcohol, and adding sufficient ammonia to react with substantially the remainder of the chloride present in the sol, and removing the ammonium chloride.

* * * * *